(12) United States Patent
Chen et al.

(10) Patent No.: US 8,629,901 B2
(45) Date of Patent: Jan. 14, 2014

(54) SYSTEM AND METHOD OF REVISING DEPTH OF A 3D IMAGE PAIR

(75) Inventors: Liang-Gee Chen, Taipei (TW); Chien Wu, Taipei (TW); Chung-Te Li, Taipei (TW); Yen-Chieh Lai, Taipei (TW); Chao-Chung Cheng, Taipei (TW); Ling-Hsiu Huang, Tainan (TW)

(73) Assignee: National Taiwan University, Taipei (TW)

( * ) Notice: Subject to any disclaimer, the term of this patent is extended or adjusted under 35 U.S.C. 154(b) by 307 days.

(21) Appl. No.: 13/111,843

(22) Filed: May 19, 2011

(65) Prior Publication Data
US 2012/0293624 A1 Nov. 22, 2012

(51) Int. Cl.
*H04N 13/02* (2006.01)
(52) U.S. Cl.
USPC .............................. 348/46; 348/42; 382/154
(58) Field of Classification Search
USPC ............................................................ 348/46
See application file for complete search history.

(56) References Cited

U.S. PATENT DOCUMENTS

| 8,428,342 B2* | 4/2013 | Tian et al. ...................... 382/154 |
| 2010/0231593 A1* | 9/2010 | Zhou et al. ..................... 345/428 |
| 2011/0032341 A1* | 2/2011 | Ignatov et al. .................. 348/51 |
| 2011/0064299 A1* | 3/2011 | Zhang et al. ................... 382/154 |
| 2011/0261050 A1* | 10/2011 | Smolic et al. .................. 345/419 |
| 2012/0200669 A1* | 8/2012 | Lai et al. ......................... 348/43 |

OTHER PUBLICATIONS

Cheng et al. "Architecture Design of Stereo Matching Using Belief Propagation" Graduate Institute of Electronics Engineering, National Taiwan University, Taiwan, pp. 4109-4112 (2010).

* cited by examiner

*Primary Examiner* — Jay Patel
*Assistant Examiner* — Jessica Prince
(74) *Attorney, Agent, or Firm* — Stout, Uxa, Buyan & Mullins LLP

(57) ABSTRACT

A method of revising depth of a three-dimensional (3D) image is disclosed. The method comprises the following steps: firstly, at least one initial depth map associated with one image of the 3D image pair based on stereo matching technique is received, wherein the one image comprises a plurality of pixels, and the initial depth map carries an initial depth value of each pixel. Then, the inconsistence among the pixels of the one image of the 3D image pair is detected to estimate a reliable map. Finally, the initial depth value is interpolated according to the reliable map and the proximate pixels, so as to generate a revised depth map by revising the initial depth value.

15 Claims, 3 Drawing Sheets

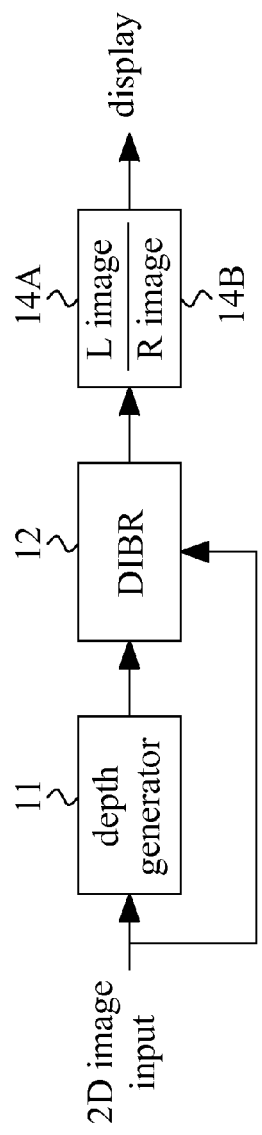
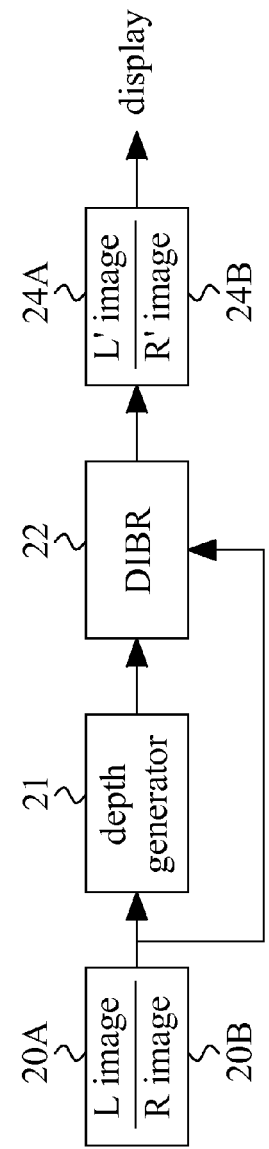

SYSTEM AND METHOD OF REVISING DEPTH OF A 3D IMAGE PAIR

BACKGROUND OF THE INVENTION

1. Field of the Invention

The present invention generally relates to digital image processing, and more particularly to a system and method of revising depth generated based on a three-dimensional (3D) image pair.

2. Description of Related Art

When three-dimensional (3D) objects are mapped onto a two-dimensional (2D) image plane by prospective projection, such as an image taken by a still camera or a video camera, a lot of information, particularly 3D depth information, disappears. A 3D imaging system, however, can convey 3D information to a viewer by recording 3D visual information or by re-creating the illusion of depth. Although the 3D imaging technique has been known for over a century, the 3D display becomes more practical and popular owing to availability of high-resolution and low-price displays such as liquid crystal displays (LCDs).

FIG. 1 shows a block diagram of a conventional 3D imaging system 1 that creates depth information by a depth generator 11 according to a 2D image input. The depth information is then processed by the depth-image-based rendering (DIBR) 12 to generate a left (L) image 14A and a right (R) image 14B, which are then displayed and viewed by the viewer.

Moreover, FIG. 2 shows a block diagram of another conventional 3D imaging system 2 that captures a left (L) image 20A and a right (R) image 20B from a target object by two cameras respectively. The depth generator 21 utilities stereo matching technique such as block matching to acquire the left and right depth information from a stereo image pair, L image 20A and R image 20B, respectively. The left and right depth information is then processed by the depth-image-based rendering (DIBR) 22 to generate at least two images with different viewpoint (i.e., at least one left (L') image 24A and at least one right (R') image 24B), which should be viewed by the viewer, according to the matching relation of the L image 20A and R image 201B.

However, for the conventional 3D imaging system 2, there are still some basic constraints in stereo videos, such as occlusion, two-camera setting parameter deviation, which may affect the generated depth information. Therefore, if only considering the matching relation of the stereo image pair, some pixels are probably induced to the unreliable depth information.

For the reason that conventional 3D imaging systems could not effectively display 3D image or video, a need has arisen to propose a novel system and method of revising depth of a 3D image that could recapture or generate 3D depth information, to faithfully and easily recover or approximate a full 3D representation.

SUMMARY OF THE INVENTION

In view of the foregoing, it is an object of the embodiment of the present invention to provide a system and method of revising depth of a three-dimensional (3D) image to increase quality of a 3D image or video.

According to one embodiment, a system of revising depth of a three-dimensional (3D) image pair which comprises a depth generator and a depth revisor is disclosed. The depth generator creates at least one initial depth map associated with one image of the 3D image pair, wherein the image comprises a plurality of pixels, and the initial depth map carries an initial depth value of each pixel of one image of the 3D image pair. The depth revisor comprises an inconsistence detection unit and an interpolation unit. The inconsistence detection unit detects the inconsistence among the pixels to estimate a reliable map. The interpolation unit interpolates the initial depth value according to the reliable map and the proximate pixels, so as to generate a revised depth map by revising the initial depth value.

According to another embodiment, a method of revising depth of a three-dimensional (3D) image pair is disclosed. The method comprises the following steps: firstly, at least one initial depth map associated with one image of the 3D image pair is received, wherein the initial depth map carries an initial depth value of each pixel of one image of the 3D image pair. Then, the inconsistence among the pixels of the image is detected to estimate a reliable map the initial depth value is interpolated according to the reliable map and the proximate pixels, so as to generate a revised depth map by revising the initial depth value.

BRIEF DESCRIPTION OF THE DRAWINGS

FIG. 1 shows a block diagram of a conventional three-dimensional (3D) imaging system;

FIG. 2 shows a block diagram of another conventional 3D imaging system;

DETAILED DESCRIPTION OF THE INVENTION

Figure 3:
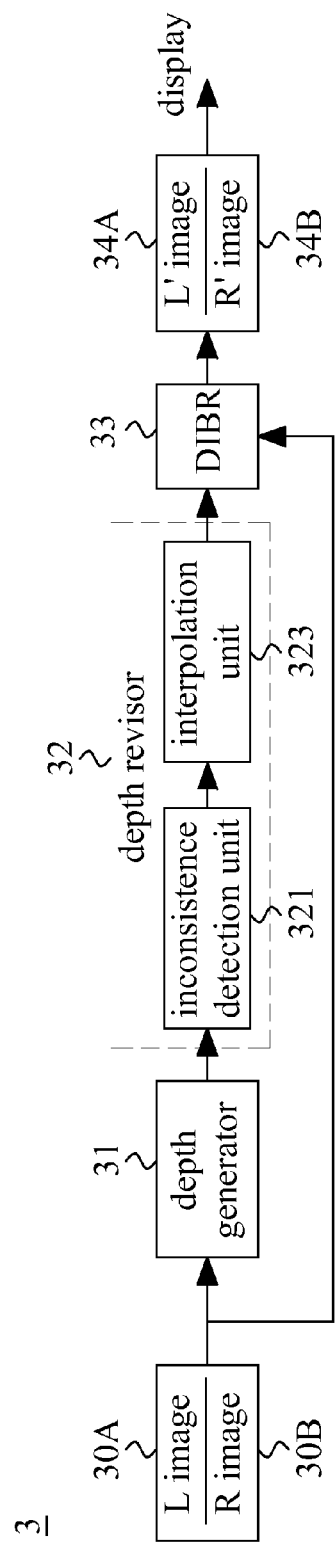
FIG. 3 shows a block diagram illustrating a system of revising depth of a 3D image pair according to one embodiment of the present invention.

FIG. 3 shows a block diagram illustrating a system of revising depth of a three-dimensional (3D) image pair according to one embodiment of the present invention. The 3D image pair is also called a stereoscopic image. The system 3 comprises a depth generator 31, a depth revisor 32 and a depth-image-based rendering (DIBR) unit 33. The depth generator 31 receives a left (L) image 30A and a right (R) image 30B, which are the 3D image pair, displayable in a 3D imaging system to generate at least one depth map. For example, the depth generator 31 may generate a left depth map and a right depth map that correspond to the original left image 30A and the right image 30B based on stereo matching technique respectively.

Figure 4:
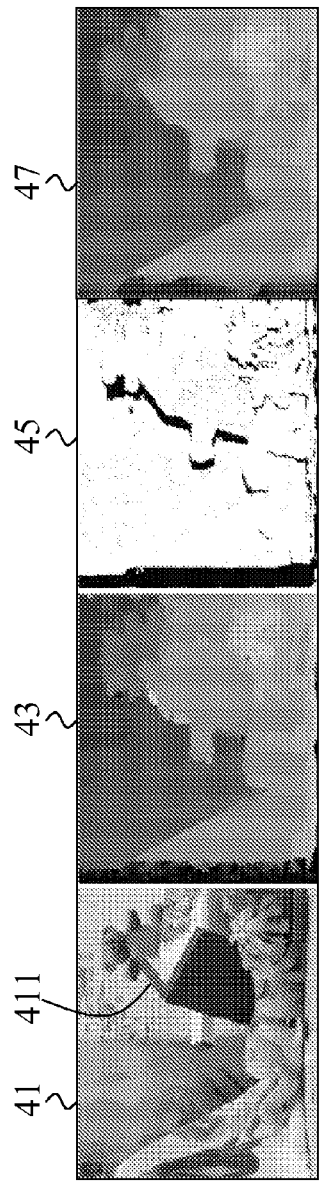
FIG. 4 exemplifies an image and the corresponding initial depth map, reliable map and revised depth map according to one embodiment of the present invention.

In order to facilitate explaining, take a single depth map for example as follows. Please refer to FIG. 4 as well. The depth generator 31 generates an initial depth map 43 associated with one image 41 (e.g., the left image 30A or the right image 30B) of the 3D image pair based on stereo matching technique/algorithm such as block matching. The image 41 comprises a plurality of pixels, and in the initial depth map 43, each pixel or block has its corresponding depth value (initial depth value). For example, an object near a viewer has a greater depth value than an object far from the viewer. As a result, in a depth-map image, the object near the viewer is brighter than the object far from the viewer. Wherein, as shown in FIG. 4, the depth information in the initial depth map 43 may be unreliable especially in the occlusion region 411 and object boundaries in the image 41.

The depth revisor 32 comprises an inconsistence detection unit 321 and an interpolation unit 323. The inconsistence detection unit 321 detects the inconsistence among the pixels by two-directional occlusion detection techniques and computes a cost value for every pixel, wherein the cost value denotes the inconsistence or discontinuity between the pixel and neighborhood nodes. Specifically, the two-directional occlusion, detection techniques are such as Left-Right-checking or Right-Left-checking to explore the locations of occlusion or boundary points happen in the image 41. The two-directional occlusion detection techniques may be implemented by a suitable conventional technique, for example, disclosed in a disclosure entitled "Detecting binocular half-occlusions: empirical comparisons of five approaches," in Pattern Analysis and Machine Intelligence, the disclosure of which is hereby incorporated by reference.

Moreover, the inconsistence detection unit 321 estimates a reliable map 45 which carries the reliable value for every pixel by checking the cost value for every pixel with the initial depth map 43. Specifically, the inconsistence detection unit 321 defines a pre-defined threshold to classify the cost values. If the cost value of the pixel is lower than the pre-defined threshold, the pixel is regarded as the reliable point, and if the cost value of the pixel is higher than the pre-defined threshold, the pixel is regarded as the unreliable point. Wherein, the reliable values of the reliable points are assigned 1, and the reliable values of the unreliable points are assigned 0 as the black region shown in the reliable map 45.

The interpolation unit 323 interpolates the initial depth map according to the reliable map 45 and the proximate pixels. In one embodiment, the interpolation unit 323 comprises a trilateral filter. Wherein, the interpolation unit 323 computes the revised depth value by spatial and luminance proximity B(.) which is computed according to the equation (1). Besides, the interpolation unit 323 excludes the unreliable point depth information by considering the reliable map 45 according to the equation (2). Wherein, $R(x,y)$ is the revised depth value for unreliable points, S is the neighborhood for the unreliable pixel $(x,y)$, $D(x,y)$ is the initial depth value, and $I(x,y)$ is the luminance value.

$$B(x, y, x_j, y_j) \cong \exp\left(-\frac{|(x_j - x)|^2}{2\sigma_x^2} - \frac{|(y_j - y)|^2}{2\sigma_y^2} - \frac{|I(x_j, y_j) - I(x, y)|^2}{2\sigma_j^2}\right) \quad (1)$$

$$R(x, y) \cong \left[ \frac{\sum O(x, y) B(x, y, x_j, y_j) D(x, y)}{\sum_{(x_j, y_j) \in S} O(x, y) B(x, y, x_j, y_j)} \right] \quad (2)$$

Therefore, the interpolation unit 323 generates a revised depth map 47 by revising the initial depth value $D(x,y)$. According to the experimental result, the depth quality of the revised depth map 47 is greatly enhanced especially in the occlusion regions and object boundaries. The revised depth map 47 from the depth revisor 32 is fed to the depth-image-based rendering (DIBR) unit 33, which generates (or synthesizes) at least one revised left (L') image 34A and at least one revised right (R') image 34B for being displayed and viewed by viewer based on the revised depth map 47 and the original left (L) image 30A and the right (R) image 30B. The DIBR unit 33 may be implemented by a suitable conventional technique, for example, disclosed in a disclosure entitled. "A 3D-TV Approach Using Depth-Image-Based Rendering (DIBR)," by Christoph Fehn, the disclosure of which is hereby incorporated, by reference.

Figure 5:
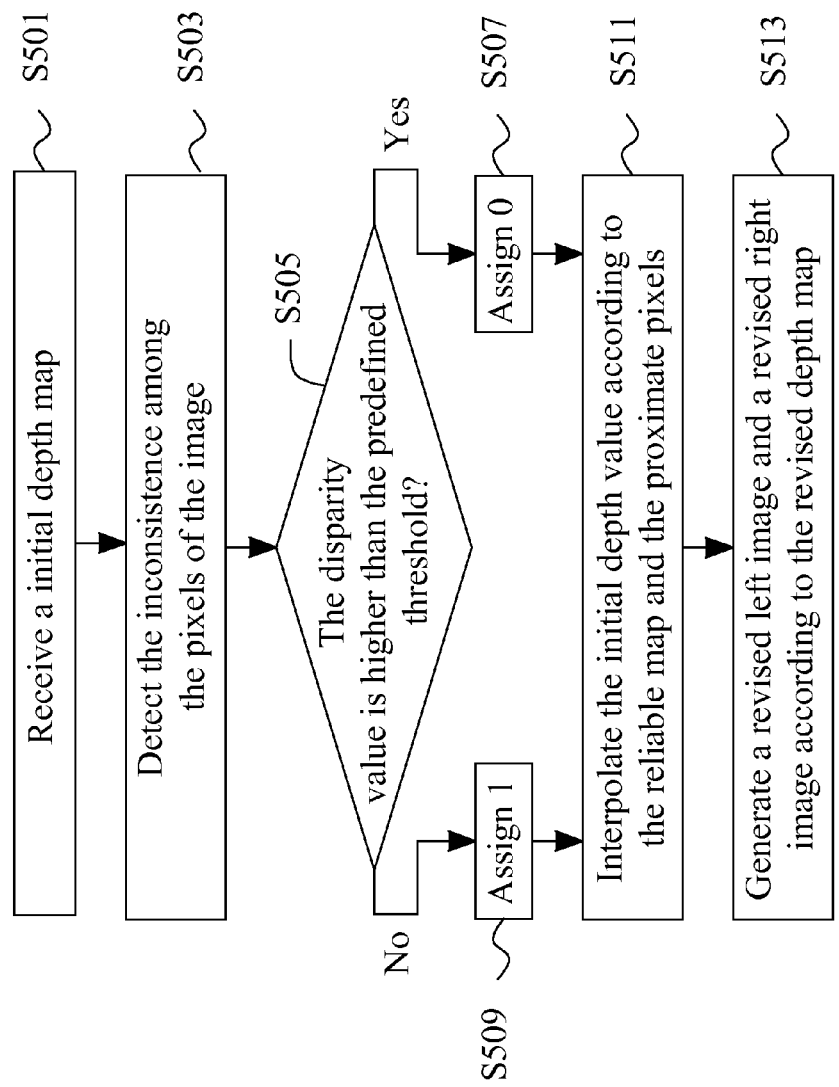
FIG. 5 shows a flow diagram illustrating a method of revising depth of a 3D image pair according to one embodiment of the present invention.

FIG. 5 shows a flow diagram illustrating a method of revising depth of a 3D image according to another embodiment of the present invention. In step S501, the depth generator 31 receives an initial depth map 43. Subsequently, in step S503, the inconsistence detection unit 321 detects the inconsistence among the pixels of the image 41 (e.g., the left image 30A or the right image 30B) and determines the cost value of each pixel is higher than the pre-defined threshold in step S505.

If the cost value of the pixel is higher than the pre-defined threshold, the reliable value of the pixel regarded as the unreliable point is assigned 0 in step S507, and if the cost value of the pixel is lower than the pre-defined threshold, the reliable value of the pixel regarded as the reliable point is assigned 1 in step S509. Finally, the interpolation unit 323 interpolates the initial depth value according to the reliable map 45 and the proximate pixels in step S511. The DIBR unit 33 then generates at least one revised left (L') image 34A and at least one revised right (R') image 34B for being displayed and viewed, by viewer based on the revised depth map 47 in step S513.

According to the foregoing embodiment, the present invention proposes a trilateral-filter-based depth interpolation algorithm to provide a depth post-processing to handle the occlusion regions and revise the unreliable depth information.

Although specific embodiments have been illustrated and described, it will be appreciated by those skilled in the art that various modifications may be made without departing from the scope of the present invention, which is intended to be limited solely by the appended claims.

What is claimed is:

1. A system of revising depth of a three-dimensional (3D) image pair, comprising:
   a depth generator configured to generate at least one initial depth map associated with one image of the 3D image pair based on stereo matching technique, wherein the one image comprises a plurality of pixels, and the initial depth map carries an initial depth value of each pixel; and
   a depth revisor, comprising:
      an inconsistence detection unit configured to detect the inconsistence among the pixels based on two-directional occlusion detection technique and estimate a reliable map according to the detected inconsistence, wherein the reliable map is composed of a group of reliable points and a group of unreliable points, the reliable points comprises the pixels, a cost value of which is lower than a pre-defined threshold, and the unreliable points comprises the pixels, a cost value of which is higher than the pre-defined threshold; and
      an interpolation unit configured to interpolate the initial depth value according to the reliable map and a plurality of proximate pixels of the image, so as to generate a revised depth map by revising the initial depth value.

2. The system of claim 1, wherein the inconsistence detection unit computes the cost value for each of the pixels which denotes the inconsistence or discontinuity between one of the pixels and neighborhood nodes.

3. The system of claim 1, wherein the interpolation unit interpolates the initial depth value by spatial and luminance proximity of the pixels for the unreliable points.

4. The system of claim 1, wherein the reliable map carries a reliable value for every pixel, and the inconsistence detection unit assigns 1 to the reliable values for the reliable points and assigns 0 to the reliable values for the unreliable points.

5. The system of claim 1, wherein the depth generator generates a left depth map corresponding to a left image and generates a right depth map corresponding to a right image, wherein the one image of the 3D image pair is the left image or the right image.

6. The system of claim 1, further comprising a depth-image-based rendering (DIBR) unit configured to receive the revised depth map and accordingly generate at least one revised left image and at least one revised right image.

7. The system of claim 1, the inconsistence detection unit utilities Left-Right-checking or Right-Left-checking techniques to detect the inconsistence.

8. The system of claim 1, the interpolation unit comprises a trilateral filter.

9. A method of revising depth of a three-dimensional (3D) image pair, comprising:
   receiving at least one initial depth map associated with one image of the 3D image pair based on stereo matching technique, wherein the image comprises a plurality of pixels, and the initial depth map carries an initial depth value of each pixel;
   detecting the inconsistence among the pixels of the one image of the 3D image pair to estimate a reliable map, wherein the reliable map carries a reliable value for every pixel, and the step of estimating the reliable map further comprises:
   providing a pre-defined threshold;
   assigns 1 to the reliable values for the pixels, a cost value of which is lower than the pre-defined threshold; and
   assigns 0 to the reliable values for the pixels, a cost value of which is higher than the pre-defined threshold; and
   interpolating the initial depth value according to the reliable map and a plurality of proximate pixels of the image, so as to generate a revised depth map by revising the initial depth value.

10. The method of claim 9, wherein the step of estimating the reliable map comprises:
    computing the cost value for each of the pixels which denotes the inconsistence or discontinuity between one of the pixels and neighborhood nodes; and
    estimating the reliable map according to the detected inconsistence.

11. The method of claim 9, wherein the step of interpolating the initial depth value comprises:
    computing the initial depth value by spatial and luminance proximity of the pixels.

12. The method of claim 9, implemented by Left-Right-checking or Right-Left-checking techniques to detect the inconsistence.

13. The method of claim 9, utilizing a trilateral filter to interpolate the initial depth value.

14. The method of claim 9, wherein said at least one initial depth map comprises a left depth map corresponding to a left image and a right depth map corresponding to a right image, wherein the one image of the 3D image pair is the left image or the right image.

15. The method of claim 9, further comprising:
    receiving the revised depth map and accordingly generating at least one revised left image and at least one revised right image.

* * * * *

UNITED STATES PATENT AND TRADEMARK OFFICE
CERTIFICATE OF CORRECTION

PATENT NO. : 8,629,901 B2
APPLICATION NO. : 13/111843
DATED : January 14, 2014
INVENTOR(S) : Liang-Gee Chen et al.

Page 1 of 1

It is certified that error appears in the above-identified patent and that said Letters Patent is hereby corrected as shown below:

Title Page, Item (73) Assignee,

"National Taiwan University" should read

-- National Taiwan University, Taipei (TW) and
   Himax Technologies Limited, Tainan City (TW) --.

Signed and Sealed this
Fifteenth Day of April, 2014

Michelle K. Lee
*Deputy Director of the United States Patent and Trademark Office*